United States Patent
Ma

(10) Patent No.: US 8,537,114 B2
(45) Date of Patent: Sep. 17, 2013

(54) MOUSE DEVICE OPERABLE WITH VARIABLE BUTTON-PRESSING FORCE

(75) Inventor: Qin-Hua Ma, Liuwu (CN)

(73) Assignee: Primax Electronics Ltd., Taipei (TW)

( * ) Notice: Subject to any disclaimer, the term of this patent is extended or adjusted under 35 U.S.C. 154(b) by 621 days.

(21) Appl. No.: 12/836,828

(22) Filed: Jul. 15, 2010

(65) Prior Publication Data

US 2011/0279371 A1    Nov. 17, 2011

(30) Foreign Application Priority Data

May 14, 2010    (TW) ................................ 99115438 A

(51) Int. Cl.
*G06F 3/033*    (2013.01)
(52) U.S. Cl.
USPC ........................................... 345/163
(58) Field of Classification Search
USPC .................. 346/163, 173; 345/164–167, 173
See application file for complete search history.

(56) References Cited

U.S. PATENT DOCUMENTS

| | | | |
|---|---|---|---|
| 2009/0009473 A1* | 1/2009 | Ho | 345/163 |
| 2011/0069008 A1* | 3/2011 | Kao | 345/163 |
| 2011/0084905 A1* | 4/2011 | Chang | 345/163 |

* cited by examiner

*Primary Examiner* — Chanh Nguyen
*Assistant Examiner* — Tsegaye Seyoum
(74) *Attorney, Agent, or Firm* — Kirton McConkie; Evan R. Witt

(57) ABSTRACT

A mouse device is operable with a variable button-pressing force. The mouse device includes a mouse base, a mouse case, a button disposed on the mouse case, a pressing plate contacted with the button, and the sliding member contacted with the pressing plate. The sliding member is partially protruded out of the mouse base, and movable with respect to the mouse base. When the sliding member is moved to a first position and contacted with a first touching part of the pressing plate, the force required for pressing the button is equal to a first downward external force. Whereas, when the sliding member is moved to a second position and contacted with a second touching part of the pressing plate, the force required for pressing the button is equal to a second downward external force.

6 Claims, 7 Drawing Sheets

MOUSE DEVICE OPERABLE WITH VARIABLE BUTTON-PRESSING FORCE

FIELD OF THE INVENTION

The present invention relates to an input device, and more particularly to a mouse device.

BACKGROUND OF THE INVENTION

With increasing development of science and technology, multimedia products and computers become essential in our daily lives. In the computer system, an input device plays an important role for communicating the computer host and the user. The common input device includes for example a mouse, a keyboard or a trackball. Among these input devices, the mouse is the most prevailing because it is very easy-to-use. When a mouse is held by a user's palm, the user may move the mouse to control movement of the cursor shown on the computer screen. In addition, by manipulating the buttons of the mouse device, the user may point and click a desired icon shown on the computer monitor or execute a corresponding function.

The configurations and the functions of a conventional mouse device will be illustrated as follows. FIG. 1 is a schematic cross-sectional view illustrating a conventional mouse device. As shown in FIG. 1, the mouse device 1 comprises a mouse base 10, a mouse case 11, a button 12, a circuit board 13 and a switch 14. The mouse case 11 is disposed on the mouse base 10 for sheltering the mouse base 10. When a user's palm is supported on the mouse base 10, the user may operate the mouse device 1. The button 12 is arranged on the mouse case 11. The button 12 has a pressing part 121 and a triggering part 122. The pressing part 121 is exposed to the outer surface of the mouse case 11 to be pressed by a user. The triggering part 122 is protruded into the space between the mouse base 10 and the mouse case 11. The circuit board 13 is disposed on the mouse base 10. The switch 14 is mounted on the circuit board 13, and arranged under the triggering part 122. In response to a downward force exerted on the pressing part 121 of the button 12 by a user's finger, the triggering part 122 is moved downwardly to trigger the switch 14. As such, a clicking signal corresponding to the pressed button 12 is generated.

Recently, the demands on the mouse devices become more stringent. For example, the operating comfort is an important factor of choosing a mouse device because most people use computers not only in the working time but also in the leisure time. Correspondingly, the mouse device is frequently used for most people. Generally, the downward force for pressing the button 12 of the mouse device 1 is constant when the mouse device 1 is operated and the button is pressed for a long time period. That is, a single downward force is employed to press the button. Since the downward force for pressing the button 12 fails to be adjusted, the procedure of pressing the button for a long time period usually incurs unacceptable fatigue of the user's hand. As the demand on comfort of using the mouse device is gradually increased, the conventional mouse device 1 is not satisfactory.

Therefore, there is a need of providing a mouse device to enhance the comfort of using the mouse device.

SUMMARY OF THE INVENTION

It is an object of the present invention to provide a mouse device operable with a variable button-pressing force in order to enhance comfort of using the mouse device.

In accordance with an aspect of the present invention, there is provided a mouse device operable with a variable button-pressing force. The mouse device includes a mouse base, a circuit board, a switch, a mouse case, a button, a pressing plate and a sliding member. The mouse base has a base perforation. The circuit board is disposed on the mouse base. The switch is mounted on the circuit board. The mouse case is used for sheltering the mouse base. The button includes a pressing part and a triggering part. The pressing part is exposed to a case surface of the mouse case. The triggering part is arranged between the switch and the mouse case. The pressing plate is arranged between the triggering part and the switch. A first surface of a first end of the pressing plate is contacted with the triggering part. A second surface of the first end of the pressing plate is contacted with the switch. The pressing plate comprises a first touching part and a second touching part. The sliding member is contacted with the pressing plate, and inserted into the base perforation to be movable within the base perforation with respect to the mouse base. The sliding member has a supporting structure contacted with either the first touching part or the second touching part. When the sliding member is moved within the base perforation and the supporting structure is contacted with the first touching part, the button is pressed with the supporting structure serving as a fulcrum, so that a first downward external force is exerted on the button. When the sliding member is moved within the base perforation and the supporting structure is contacted with the second touching part, the button is pressed with the supporting structure serving as the fulcrum, so that a second downward external force is exerted on the button.

In an embodiment, the mouse device further includes a fixing frame, which is disposed on the mouse base for fixing the pressing plate. The fixing frame includes plural fixing holes and a slot. The supporting structure penetrates through the slot. The supporting structure is movable within the slot.

In an embodiment, the mouse base further includes plural fixing posts. The fixing posts are contacted with respectively fixing holes, so that the fixing frame is fixed on the mouse base.

In an embodiment, the mouse device further includes a fixing cover for sheltering the pressing plate and facilitating fixing the pressing plate on the fixing frame.

In an embodiment, the pressing plate further includes a third touching part. When the sliding member is moved to a first position of the base perforation and the supporting structure is contacted with the first touching part, the button is pressed with the supporting structure serving as the fulcrum, so that the first downward external force is exerted on the button. When the sliding member is moved to a second position of the base perforation and the supporting structure is contacted with the second touching part, the button is pressed with the supporting structure serving as the fulcrum, so that the second downward external force is exerted on the button. When the sliding member is moved to a third position of the base perforation and the supporting structure is contacted with the third touching part, the button is pressed with the supporting structure serving as the fulcrum, so that a third downward external force is exerted on the button.

In an embodiment, the first touching part is apart from the first end of the pressing plate by a first distance. The second touching part is apart from the first end of the pressing plate by a second distance. The third touching part is apart from the first end of the pressing plate by a third distance. The first distance is greater than the second distance. The second distance is greater than the third distance.

In an embodiment, the mouse base further includes a first rib and a second rib, which are arranged beside the base perforation. The first rib is arranged between the first position and the second position. The second rib is arranged between the second position and the third position.

In an embodiment, the sliding member includes an operating part, a transmission part and spring. The operating part is inserted into the base perforation, and slid to be moved between the first position, the second position and the third position. The operating part includes a connecting post and a protrusion. The protrusion is arranged at a side of the operating part. The protrusion is hindered by the first rib or the second rib to hinder the operating part from sliding within the base perforation. The transmission part is connected with the operating part, so that the transmission part and the operating part are synchronously moved. The supporting structure is disposed on the transmission part. The spring is sheathed around the connecting post, and arranged between the transmission part and the operating part for providing an elastic force, so that the operating part is movable upwardly or downwardly with respect to the mouse base. By sliding the operating part, the spring is compressed and the protrusion is moved upwardly with respect to the mouse base to cross the first rib or the second rib. After the protrusion crosses the first rib or the second rib, the spring is restored, and the protrusion is moved downwardly with respect to the mouse base to return an original position.

In an embodiment, the connecting post and the protrusion are integrally formed with the operating part, and the supporting structure is integrally formed with the transmission part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a mouse device operable with a variable button-pressing force. The configurations of the components within the mouse device of the present invention will be illustrated as follows.

Figure 1:
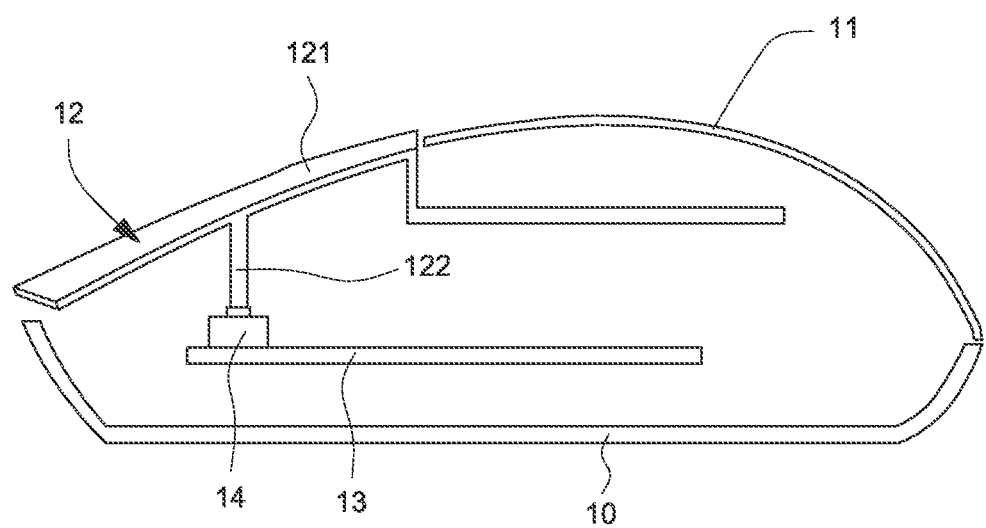
FIG. 1 is a schematic cross-sectional view illustrating a conventional mouse device.
Figure 2:
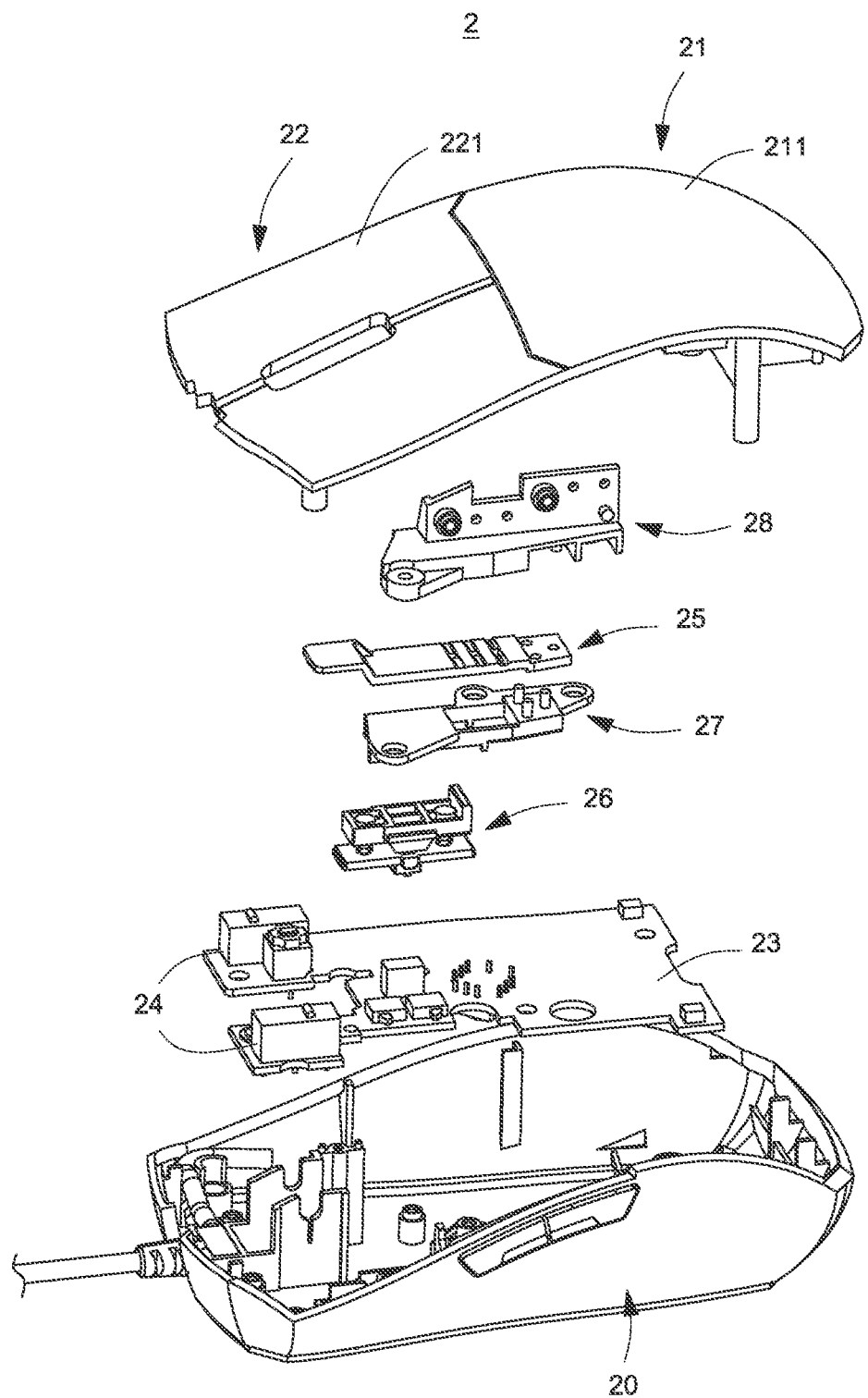
FIG. 2 is a schematic perspective view illustrating a mouse device according to an embodiment of the present invention.

FIG. 2 is a schematic perspective view illustrating a mouse device according to an embodiment of the present invention. As shown in FIG. 2, the mouse device 2 comprises a mouse base 20, a mouse case 21, a button 22, a circuit board 23, a switch 24, a pressing plate 25, a sliding member 26, a fixing frame 27 and a fixing cover 28. The mouse case 21 has a case surface 211. The button 22 comprises a pressing part 221 and a triggering part 222 (see FIG. 5). The pressing part 221 is exposed to the case surface 211 of the mouse case 21. The pressing plate 25 comprises a first touching part 253 (see FIG. 6), a second touching part 254 (see FIG. 7) and a third touching part 255 (see FIG. 8).

Figure 3:
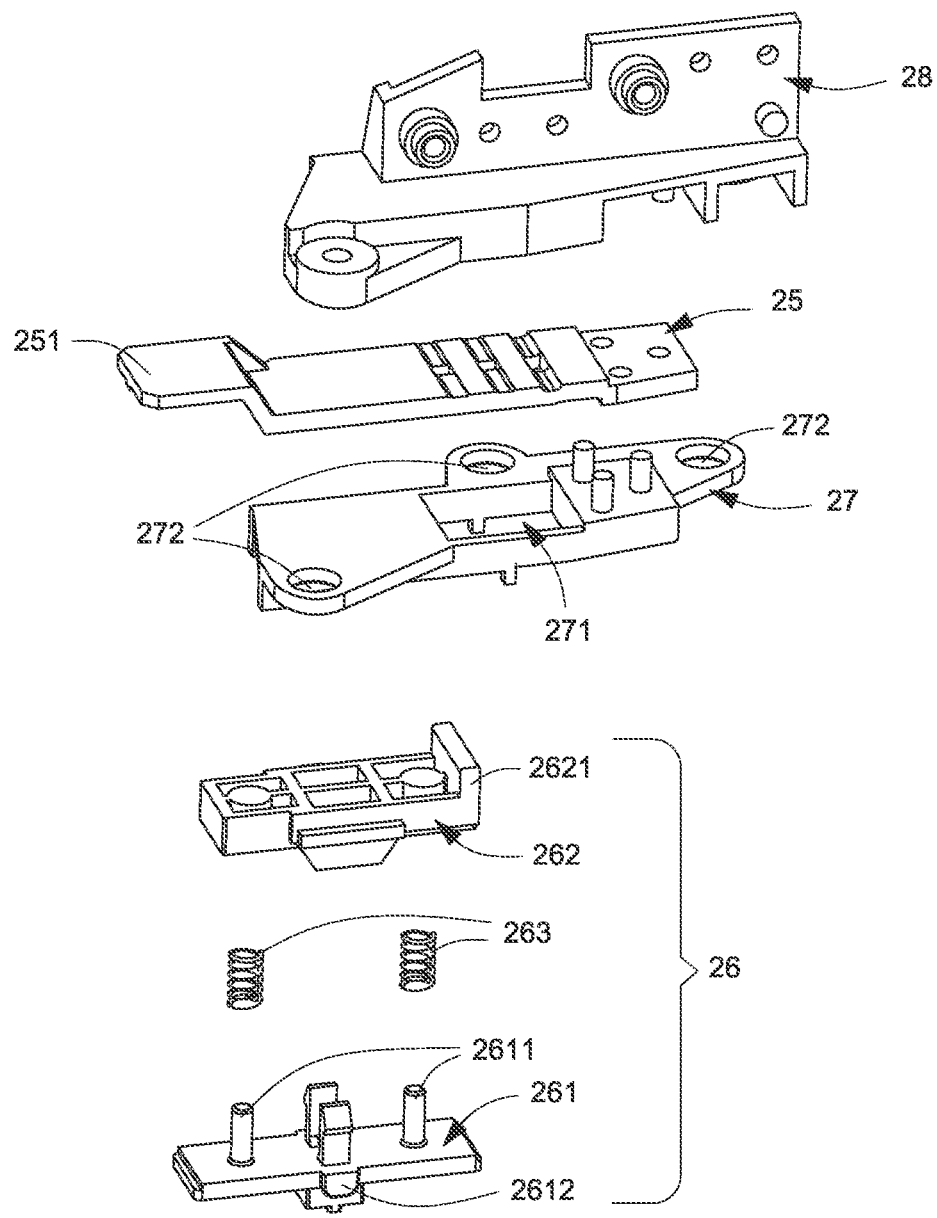
FIG. 3 is a schematic exploded view illustrating a portion of the mouse device according to an embodiment of the present invention.

Hereinafter, the configurations of the sliding member 26 and the fixing frame 27 will be illustrated with reference to FIG. 3. FIG. 3 is a schematic exploded view illustrating a portion of the mouse device according to an embodiment of the present invention. The sliding member 26 comprises an operating part 261, a transmission part 262 and a spring 263. The operating part 261 comprises a connecting post 2611 and a protrusion 2612. The protrusion 2612 is arranged at a first side of the operating part 261. The transmission part 262 is connected with the operating part 261, so that the transmission part 262 and the operating part 261 are synchronously moved. The transmission part 262 has a supporting structure 2621. In this embodiment, the supporting structure 2621 is integrally formed with the transmission part 262. The spring 263 is sheathed around the connecting post 2611, and arranged between the transmission part 262 and the operating part 261. The spring 263 is used for providing an elastic force. In this embodiment, the connecting post 2611 and the protrusion 2612 are integrally formed with the operating part 261. The connecting relationships between the operating part 261, the transmission part 262 and the spring 263 are shown in FIG. 2. The fixing frame 27 is used for fixing the pressing plate 25 thereon. The fixing frame 27 comprises a slot 271 and plural fixing holes 272. The supporting structure 2621 penetrates through the slot 271, and is movable within the slot 271. The fixing cover 28 is used for sheltering the pressing plate 25 and facilitating fixing the pressing plate 25 on the fixing frame 27.

Figure 4:
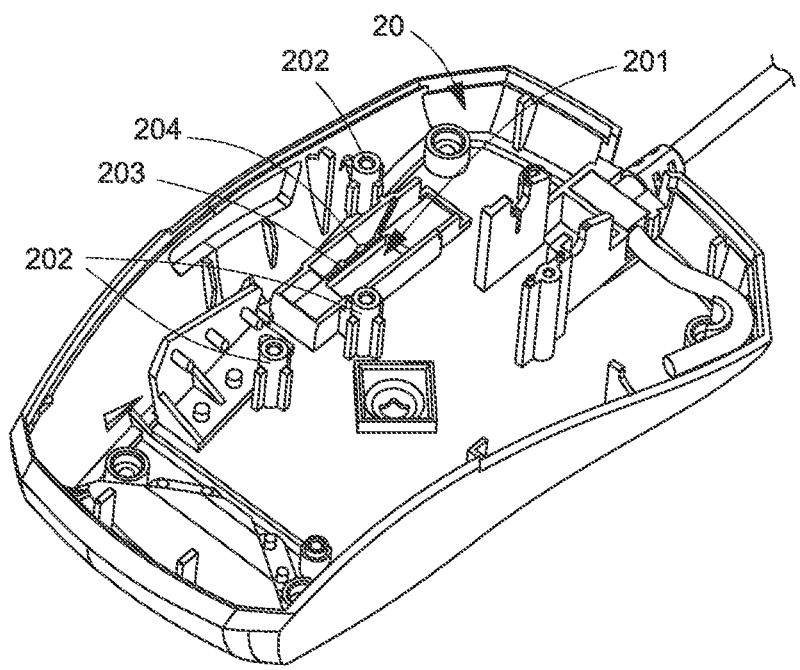
FIG. 4 is a schematic exploded view illustrating the mouse base of the mouse device according to an embodiment of the present invention.
Figure 5:
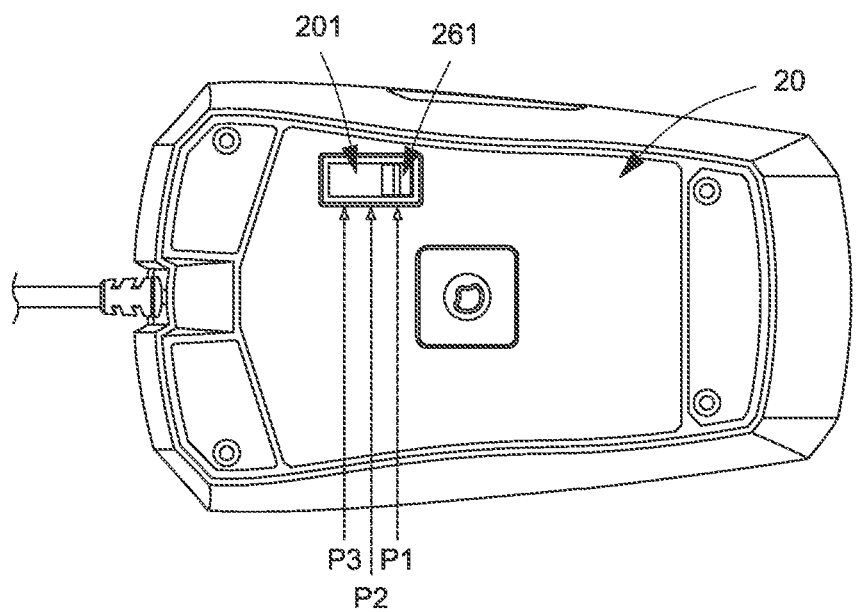
FIG. 5 is a schematic rear view illustrating a mouse device according to an embodiment of the present invention.

Hereinafter, the configurations of the mouse base 20 will be illustrated with reference to FIG. 4. FIG. 4 is a schematic exploded view illustrating the mouse base of the mouse device according to an embodiment of the present invention. As shown in FIG. 4, the mouse base 20 comprises a base perforation 201, plural fixing posts 202, a first rib 203 and a second rib 204. The operating part 261 of the sliding member 26 is inserted into the base perforation 201, so that the operating part 261 is movable within the base perforation 201. The operating part 261 is exposed out of the mouse base 20 to be manipulated by the user (see FIG. 5). As shown in FIG. 5, the operating part 261 is located at a first position P1 of the base perforation 201. By manipulating the operating part 261, the operating part 261 could be moved to a second position P2 or a third position P3 of the base perforation 201.

Figure 6:
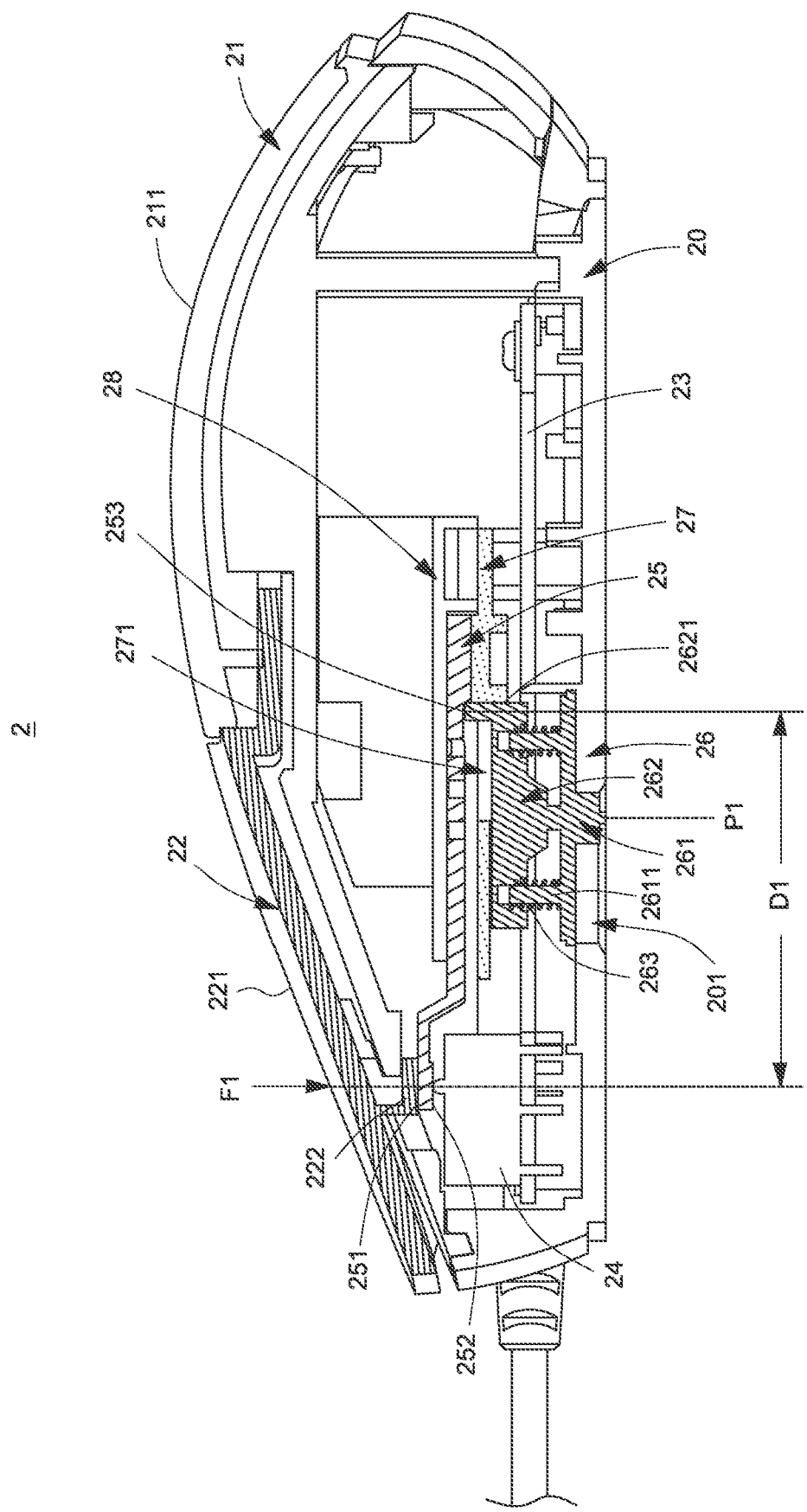
FIG. 6 is a schematic cross-sectional view illustrating a mouse device according to an embodiment of the present invention.

FIG. 6 is a schematic cross-sectional view illustrating a mouse device according to an embodiment of the present invention. The circuit board 23 is disposed on the mouse base 20. The switch 24 is mounted on the circuit board 23. The mouse case 21 is used for sheltering the mouse base 20, so that a space is formed between the mouse case 21 and the mouse base 20. The triggering part 222 of the button 22 is arranged between the switch 24 and the mouse case 21, and contacted with a first surface 251 of a first end of the pressing plate 25. A second surface 252 of the first end of the pressing plate 25 is contacted with the switch 24. A second end of the pressing plate 25 is disposed on the fixing frame 27. The fixing cover 28 is used for sheltering the pressing plate 25 and facilitating fixing the pressing plate 25 on the fixing frame 27. The supporting structure 2621 of the sliding member 26 penetrates through the slot 271 of the fixing frame 27, and is connected with the fixing frame 27. The operating part 261 of the sliding member 26 is inserted into the base perforation 201. The fixing frame 27 is fixed on the mouse base 20.

Please refer to FIG. 4 again. The plural fixing posts 202 of the mouse base 20 are respectively aligned with the plural fixing holes 272 of the fixing frame 27. After the fixing posts 202 are contacted with respective fixing holes 272, the fixing holes 272 are coupled with the fixing posts 202 by screwing means (not shown).

Please refer to FIG. 6 again. When the mouse device 2 with a variable button-pressing force according to the present invention is operated, the operating part 261 is located at a first position P1 of the base perforation 201. In addition, the supporting structure 2621 of the sliding member 26 penetrates through the slot 271 of the fixing frame 27, and is contacted with the first touching part 253 of the pressing plate 25. Meanwhile, the horizontal spacing interval between the first touching part 253 and the pressing part 221 is equal to a first distance D1. When the pressing part 221 of the button 22 is pressed by the user, the pressing part 221 is moved downwardly with respect to the mouse case 21 to press the pressing plate 25. As the pressing plate 25 is pressed, the switch 24 is touched and triggered to generate a triggering signal. That is, when the pressing part 221 of the button 22 is pressed with the supporting structure 2621 serving as a fulcrum, a first downward external force F1 is exerted on the button 22. Meanwhile, the lever arm between the fulcrum and the application point of the force (at the button 22) is equal to the first distance D1. In other words, the torque on the button 22 is equal to the first downward external force F1 multiplied by the first distance D1.

Figure 7:
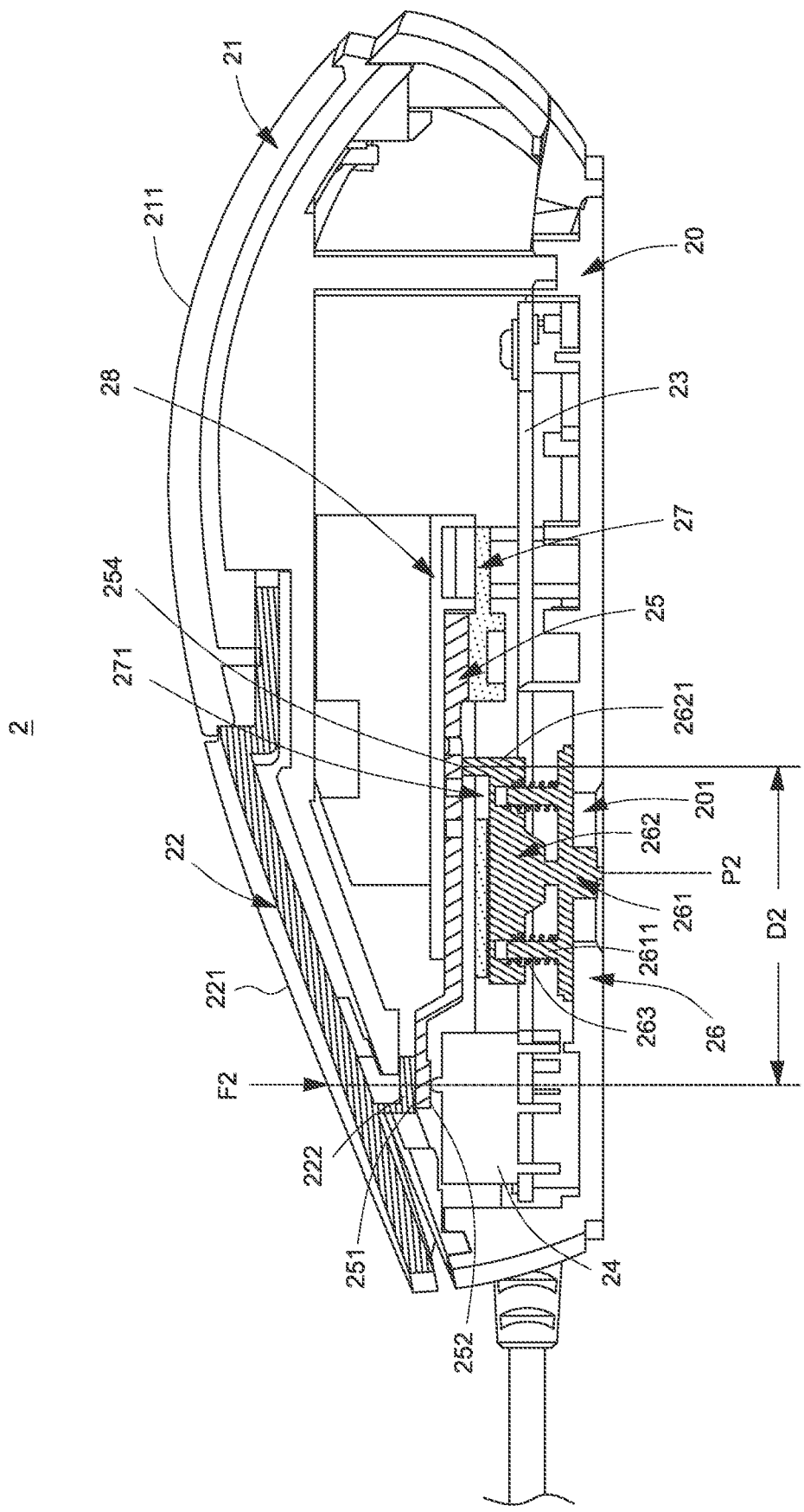
FIG. 7 is a schematic cross-sectional view illustrating a mouse device according to an embodiment of the present invention, in which the sliding member is located at a second position.

FIG. 7 is a schematic cross-sectional view illustrating a mouse device according to an embodiment of the present invention, in which the sliding member is located at a second position. When the user wants to change the button-pressing force, the user may move the operating part 261 from the first position P1 to the second position P2. As such, the supporting structure 2621 is moved within the slot 271, and contacted with the second touching part 254 of the pressing plate 25. Meanwhile, the horizontal spacing interval between the second touching part 254 and the pressing part 221 is equal to a second distance D2. When the pressing part 221 of the button 22 is pressed with the supporting structure 2621 serving as a fulcrum, a second downward external force F2 is exerted on the button 22. Meanwhile, the lever arm between the fulcrum and the application point of the force (at the button 22) is equal to the second distance D2. In other words, the torque on the button 22 is equal to the second downward external force F2 multiplied by the second distance D2.

Figure 8:
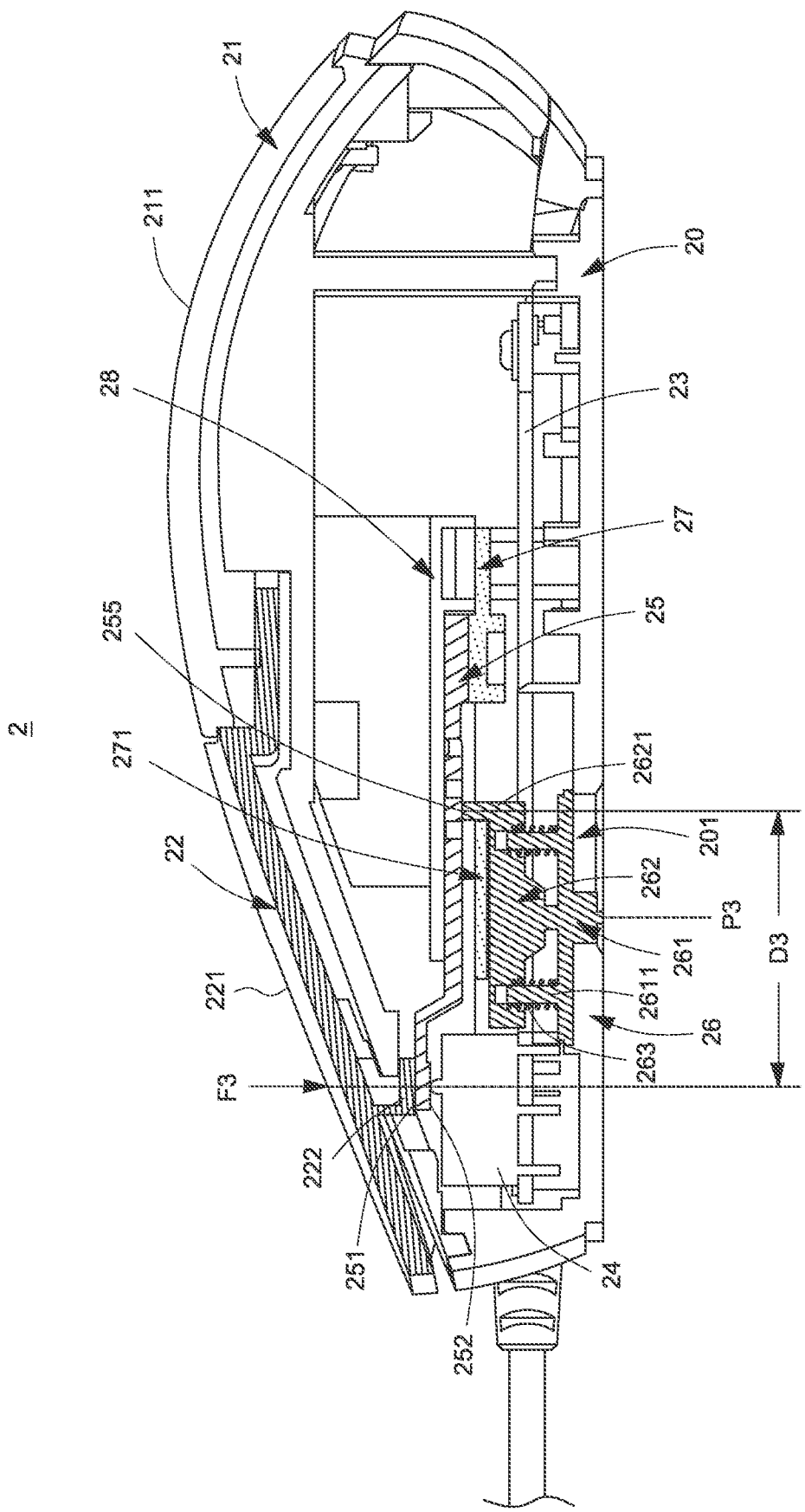
FIG. 8 is a schematic cross-sectional view illustrating a mouse device according to an embodiment of the present invention, in which the sliding member is located at a third position.

FIG. 8 is a schematic cross-sectional view illustrating a mouse device according to an embodiment of the present invention, in which the sliding member is located at a third position. When the user wants to change the button-pressing force, the user may move the operating part 261 from the second position P2 to the third position P3. As such, the supporting structure 2621 is moved within the slot 271, and contacted with the third touching part 255 of the pressing plate 25. Meanwhile, the horizontal spacing interval between the third touching part 255 and the pressing part 221 is equal to a third distance D3. When the pressing part 221 of the button 22 is pressed with the supporting structure 2621 serving as a fulcrum, a third downward external force F3 is exerted on the button 22. Meanwhile, the lever arm between the fulcrum and the application point of the force (at the button 22) is equal to the third distance D3. In other words, the torque on the button 22 is equal to the third downward external force F3 multiplied by the third distance D3.

From the above description, the first downward external force F1 multiplied by the first distance D1 is equal to the second downward external force F2 multiplied by the second distance D2, and the second downward external force F2 multiplied by the second distance D2 is equal to the third downward external force F3 multiplied by the third distance D3. As shown in FIGS. 6, 7 and 8, the first distance D1 is greater than the second distance D2, and the second distance D2 is greater than the third distance D3. In other words, the first downward external force F1 is smaller than the second downward external force F2, and the second downward external force F2 is smaller than the third downward external force F3.

Moreover, for preventing the operating part 261 from arbitrarily gliding within the base perforation 201, the mouse base 20 further comprises a first rib 203 and a second rib 204. The first rib 203 is arranged between the first position P1 and the second position P2, and the second rib 204 is arranged between the second position P2 and the third position P3 (see FIG. 4). In addition, the operating part 261 has the protrusion 2612, and the protrusion 2612 is arranged at a first side of the operating part 261 (see FIG. 3). When the sliding member 26 is contacted with the mouse base 20 and the operating part 261 is inserted into the base perforation 201, the protrusion 2612 of the operating part 261 is arranged beside the base perforation 201. As such, the protrusion 2612 is hindered by the first rib 203 or the second rib 204 to prevent the operating part 261 from sliding within the base perforation 201. During the operating part 261 is moved from the first position P1 to the second position P2, a component force in the direction toward the second position P2 and another component force in the direction toward the mouse case 21 are acquired. As such, the spring 263 is compressed, and the protrusion 2612 is moved upwardly with respect to the mouse base 20 to cross the first rib 203. After the protrusion 2612 crosses the first rib 203, the spring 263 is restored to its original position, and the protrusion 2612 is moved downwardly with respect to the mouse base 20 to return its original position. The procedure of moving the operating part 261 from the second position P2 to the third position P3 is similar to that of moving the operating part 261 from the first position P1 to the second position P2, and is not redundantly described herein. By means of the first rib 203, the second rib 204 and the spring 263 of the mouse device 2, the user may feel the sliding tactile feel during the operating part 261 is moved.

From the above description, the mouse device of the present invention is operable with a variable button-pressing force. By moving the sliding member 26, the sliding member 26 may be contacted with the first touching part, the second touching part and the third touching part. Since the first touching part, the second touching part and the third touching part are arranged at different positions of the pressing plate, the lever arm is changed by moving the position of the fulcrum. In other words, a desired downward external force exerted on the button may be adjusted. Since downward external force exerted on the button is adjustable according to the practical requirements of the user, the comfort of using the mouse device is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device operable with a variable button-pressing force, said mouse device comprising:
   a mouse base having a base perforation, wherein said mouse base further comprises a first rib and a second rib, which are arranged beside said base perforation, wherein said first rib is arranged between said first position and said second position, and said second rib is arranged between said second position and said third position;
   a circuit board disposed on said mouse base;
   a switch mounted on said circuit board;
   a mouse case for sheltering said mouse base;
   a button comprising a pressing part and a triggering part, wherein said pressing part is exposed to a case surface of said mouse case, and said triggering part is arranged between said switch and said mouse case;
   a pressing plate arranged between said triggering part and said switch, wherein a first surface of a first end of said pressing plate is contacted with said triggering part, a second surface of said first end of said pressing plate is contacted with said switch, and said pressing plate comprises a first touching part, a second touching part, and a third touching part; and
   a sliding member contacted with said pressing plate, and inserted into said base perforation to be movable within said base perforation with respect to said mouse base, wherein said sliding member has a supporting structure contacted with either said first touching part or said second touching part, wherein when said sliding member is moved within said base perforation and said supporting structure is contacted with said first touching part, said button is pressed with said supporting structure serving as a fulcrum, so that a first downward external force is exerted on said button, wherein when said sliding member is moved within said base perforation and said supporting structure is contacted with said second touching part, said button is pressed with said supporting structure serving as said fulcrum, so that a second downward external force is exerted on said button, wherein when said sliding member is moved to a first position of said base perforation and said supporting structure is contacted with said first touching part, said button is pressed with said supporting structure serving as said fulcrum, so that said first downward external force is exerted on said button, wherein when said sliding member is moved to a second position of said base perforation and said supporting structure is contacted with said second touching part, said button is pressed with said supporting structure serving as said fulcrum, so that said second downward external force is exerted on said button, wherein when said sliding member is moved to a third position of said base perforation and said supporting structure is contacted with said third touching part, said button is pressed with said supporting structure serving as said fulcrum, so that a third downward external force is exerted on said button, wherein said sliding member comprises:
   an operating part inserted into said base perforation, and slid to be moved between said first position, said second position and said third position, wherein said operating part comprises a connecting post and a protrusion, said protrusion is arranged at a side of said operating part, wherein said protrusion is hindered by said first rib or said second rib to hinder said operating part from sliding within said base perforation;
   a transmission part connected with said operating part, so that said transmission part and said operating part are synchronously moved, wherein said supporting structure is disposed on said transmission part; and
   a spring sheathed around said connecting post, and arranged between said transmission part and said operating part for providing an elastic force, so that said operating part is movable upwardly or downwardly with respect to said mouse base, wherein by sliding said operating part, said spring is compressed and said protrusion is moved upwardly with respect to said mouse base to cross said first rib or said second rib, wherein after said protrusion crosses said first rib or said second rib, said spring is restored, and said protrusion is moved downwardly with respect to said mouse base to return an original position.

2. The mouse device according to claim 1 further comprising a fixing frame, which is disposed on said mouse base for fixing said pressing plate, wherein said fixing frame comprises plural fixing holes and a slot, said supporting structure penetrates through said slot, and said supporting structure is movable within the slot.

3. The mouse device according to claim 2 wherein said mouse base further comprises plural fixing posts, wherein said fixing posts are contacted with respectively fixing holes, so that said fixing frame is fixed on said mouse base.

4. The mouse device according to claim 2 further comprising a fixing cover for sheltering said pressing plate and facilitating fixing said pressing plate on said fixing frame.

5. The mouse device according to claim 1 wherein said first touching part is apart from said first end of said pressing plate by a first distance, said second touching part is apart from said first end of said pressing plate by a second distance, said third touching part is apart from said first end of said pressing plate by a third distance, said first distance is greater than said second distance, and said second distance is greater than said third distance.

6. The mouse device according to claim 1 wherein said connecting post and said protrusion are integrally formed with said operating part, and said supporting structure is integrally formed with said transmission part.

* * * * *